United States Patent
Periyathambi et al.

(10) Patent No.: US 11,321,737 B2
(45) Date of Patent: May 3, 2022

(54) TECHNIQUES OF PREFETCHING OPERATION COST BASED DIGITAL CONTENT AND DIGITAL CONTENT WITH EMPHASIS

(71) Applicant: eBay Inc., San Jose, CA (US)

(72) Inventors: Ramesh Periyathambi, San Ramon, CA (US); Manojkumar Rangasamy Kannadasan, Fremont, CA (US); Lakshimi Duraivenkatesh, San Ramon, CA (US); Vineet Bindal, San Jose, CA (US); Selcuk Kopru, San Jose, CA (US); Tomer Lancewicki, Jersey City, NJ (US)

(73) Assignee: eBay Inc., San Jose, CA (US)

( * ) Notice: Subject to any disclaimer, the term of this patent is extended or adjusted under 35 U.S.C. 154(b) by 11 days.

(21) Appl. No.: 16/713,893

(22) Filed: Dec. 13, 2019

(65) Prior Publication Data

US 2021/0182904 A1    Jun. 17, 2021

(51) Int. Cl.
*G06Q 30/02* (2012.01)
*G06N 5/04* (2006.01)
*G06N 20/00* (2019.01)

(52) U.S. Cl.
CPC .......... *G06Q 30/0254* (2013.01); *G06N 5/04* (2013.01); *G06N 20/00* (2019.01)

(58) Field of Classification Search
CPC ....... G06Q 30/0207–30/0277; G06Q 30/0254; G06N 20/00; G06N 5/04
USPC .................................................. 705/14, 319
See application file for complete search history.

(56) References Cited

U.S. PATENT DOCUMENTS

| | | | |
|---|---|---|---|
| 9,106,607 B1 * | 8/2015 | Lepeska | H04L 67/2842 |
| 9,405,427 B2 | 8/2016 | Curtis et al. | |
| 9,769,030 B1 * | 9/2017 | Ramalingam | H04L 41/22 |
| 9,912,718 B1 * | 3/2018 | Lepeska | G06F 16/9566 |
| 10,311,372 B1 | 6/2019 | Hotchkies et al. | |
| 11,016,900 B1 * | 5/2021 | Karve | G06F 12/0897 |
| 11,106,540 B1 * | 8/2021 | Welcker | G06F 11/1451 |

(Continued)

OTHER PUBLICATIONS

Precog: Action-Based Time-Shifted Prefetching for Web Applications on Mobile Devices (Year: 2017).*

(Continued)

*Primary Examiner* — Gautam Ubale
(74) *Attorney, Agent, or Firm* — FIG. 1 Patents

(57) ABSTRACT

Techniques for prefetching operation cost based digital content and digital content with emphasis that overcome the challenges of conventional systems are described. In one example, a computing device may receive digital content representations of digital content from a service provider system, which are displayed on a user interface of the computing device. Thereafter, the computing device may also receive digital content as prefetches having a changed display characteristic as emphasizing a portion of the digital content based on a model trained using machine learning. Alternatively, the computing device may receive digital content as a prefetch based on a model trained using machine learning in which the model addresses a likelihood of conversion of a good or service and an operation cost of providing the digital content. Upon receiving a user input selecting one of the digital content representations, digital content is rendered in the user interface of the computing device.

20 Claims, 10 Drawing Sheets

(56) References Cited

U.S. PATENT DOCUMENTS

| | | | |
|---|---|---|---|
| 2007/0216674 A1* | 9/2007 | Subramanian | H04L 67/42 345/418 |
| 2008/0301300 A1* | 12/2008 | Toub | H04L 67/02 709/227 |
| 2011/0125871 A1* | 5/2011 | Subramanian | G06F 16/172 709/218 |
| 2011/0304625 A1* | 12/2011 | Gerhard | G06T 11/00 345/428 |
| 2012/0110269 A1* | 5/2012 | Frank | G06F 9/383 711/137 |
| 2013/0226837 A1* | 8/2013 | Lymberopoulos | G06F 16/9574 706/12 |
| 2015/0066907 A1* | 3/2015 | Somaiya | G06F 16/9535 707/722 |
| 2015/0220972 A1 | 8/2015 | Subramanya et al. | |
| 2015/0371142 A1* | 12/2015 | Jain | G06N 5/048 706/52 |
| 2016/0007057 A1* | 1/2016 | Niesen | H04N 21/23106 725/115 |
| 2016/0205209 A1* | 7/2016 | Kapadia | G06N 5/04 709/213 |
| 2016/0342288 A1 | 11/2016 | Konik et al. | |
| 2017/0019446 A1* | 1/2017 | Son | H04W 4/021 |
| 2017/0251081 A1 | 8/2017 | Roychowdhury et al. | |
| 2017/0316321 A1* | 11/2017 | Whitney | H04L 67/2847 |
| 2018/0114139 A1 | 4/2018 | Kucera | |
| 2018/0150874 A1* | 5/2018 | Chen | G06Q 30/0254 |
| 2018/0336415 A1* | 11/2018 | Anorga | G06F 16/50 |
| 2019/0230186 A1 | 7/2019 | Yellin et al. | |
| 2019/0303973 A1* | 10/2019 | Nath | G06Q 30/0255 |
| 2019/0377830 A1* | 12/2019 | Weldemariam | G06F 9/453 |
| 2020/0098139 A1* | 3/2020 | Kaplanyan | G06T 9/002 |
| 2020/0145504 A1* | 5/2020 | Price | G06N 20/00 |
| 2020/0159391 A1* | 5/2020 | Kleinpeter | H04L 67/04 |
| 2020/0175115 A1* | 6/2020 | Pandit | G06N 20/00 |
| 2020/0233924 A1* | 7/2020 | George | G06F 40/197 |
| 2020/0250259 A1* | 8/2020 | Nanavati | H04L 67/2819 |
| 2020/0401522 A1* | 12/2020 | Xu | G06F 16/9574 |
| 2020/0413118 A1* | 12/2020 | Haribhaskaran | H04N 21/2402 |

OTHER PUBLICATIONS

Cache_Optimization_in_IPTV_Network_Using_Big_Data_Analytics_and_Mobile_Agent_Technology (Year: 2017).*

Dynamically Caching Video Content Based on User Likelihood of Interacting With Content Element (Year: 2017).*

Dahlan, et al., "Implementation of Asynchronous Predictive Fetch to Improve the Performance of Ajax-Enabled Web Applications", Proceedings of the 10th International Conference on Information Integration and Web-based Applications & Services, Nov. 24-26, 2008, 345-350 pages.

* cited by examiner

TECHNIQUES OF PREFETCHING OPERATION COST BASED DIGITAL CONTENT AND DIGITAL CONTENT WITH EMPHASIS

BACKGROUND

A multitude of digital content may be accessed by computing devices via the Internet. In one example, users may utilize computing devices to access a variety of digital content such as digital images, videos, and so on, via websites hosted by various service provider systems. Oftentimes, however, users face issues interacting with digital content. For example, videos may take too long to access, thumbnails corresponding to various images and videos may either be inaccessible or displayed in a disorderly manner on a user interface, and so forth. Consequently, user interactions with websites that include such content is frustrated.

Subsequent techniques have been developed that partially address these problems. In one example, conventional systems reduce delays of communicating and displaying images by prefetching all images during an idle time of a browser, or by progressively communicating images such that a lower resolution version of the image is initially downloaded and replaced with a higher resolution version of the image. These techniques, however, are computationally inefficient and only marginally reduce delays and sometimes even result in excessive use of computational resources by communicating content that may not be selected by a user. In another example, all thumbnails corresponding to digital content may be displayed on a single webpage, e.g., by reducing thumbnail display size. The webpage may, however, appear disorganized as a result of such a display configuration, which also frustrates users. Moreover, certain webpages may not have adequate space to display all thumbnails.

SUMMARY

Techniques for prefetching operation cost based digital content and digital content with emphasis are described. These techniques overcome the problems present in conventional techniques. In one example, a service provider system, based on receiving digital content from a computing device, may provide access to the content via a website supported by the service provider system. A computing device may access this digital content by, e.g., entering search terms and selecting a link associated with this content.

Upon selection of the link, the computing device may receive digital content representations of the digital content from the service provider system, which may be displayed on the interface of the computing device. These representations may be interactive thumbnails that, when selected, cause display of corresponding digital content in a particular portion of the interface. The computing device may also receive digital content as a prefetch with changed display characteristics (e.g., an addition of a digital label, badge, highlighting, and so forth), which provides emphasis to a portion of this content. The service provider system may change display characteristics based on a machine learning trained model trained on training data that describes, e.g., the scrolling and clicking patterns of users, the amount of time users spend viewing the listings, and so forth. An example of such a machine learning trained model is one that is trained using reinforcement learning with feedback loop. The prefetched digital content with emphasis may be stored locally in the storage of the computing device. Alternatively, the prefetched digital content with emphasis may be stored in the cloud, or as part of or in association with the service provider system.

Alternatively, the computing device may receive digital content as a prefetch based on a likelihood of conversion of a good or service and an operation cost of providing the digital content. In some cases, digital images may be prefetched from a sale listing instead of or prior to videos and high resolution images (and other such content), as videos and high resolution images have higher download times and take longer to be displayed on user interfaces. In short, the service provider system may prioritize prefetching digital images instead of or prior to videos and high resolution images because the operation cost of providing videos and high resolution images may outweigh the benefit of conversion rates of sale listings that include these videos and high resolution images, even though these rates may be higher than those for other types of content such as images. This prefetched digital content may also be stored locally in the storage of the computing device. Alternatively, the prefetched digital content may be stored in the cloud, or as part of or in association with the service provider system.

After receiving digital content as prefetches, the computing may receive a user input selecting one of the digital content representations displayed in the user interface of the computing device. In response, the prefetched digital content corresponding to the selected representation may be rendered in a particular portion of the interface. For example, if the prefetched digital content has a changed display characteristic, a portion of the interface may show a digital image with a badge or label when the user selects the interactive thumbnail corresponding to this image. In another example, if the digital content is prefetched based on an operation cost calculation, a digital image may be prefetched instead of a video or prior to a video and a representation of the prefetched image may be displayed in a more favorable location than the representation of the video. The service provider system may place the digital image in a more favorable location based on an operational cost calculation that indicates that, e.g., the video may too long to download and display, and an item may be purchased even if the user views the digital image of the item instead of the video related to the item. In this example, the digital image may correspond with a first thumbnail, while the video may correspond with a fifth thumbnail. Finally, a user selection of the first thumbnail may cause rendering of the digital image, while selection of the fifth thumbnail may cause rendering of the video.

In this way, digital content may be prefetched using a machine learning trained model that balances the operation cost of providing the digital content of an item with the probability that users that interact with this content will purchase the item. Additionally, digital content may also be prefetched using a machine learning trained model that is trained based on reinforcement learning with feedback loop. Moreover, emphasis may be added to this content based on another layer of the machine learning model. In this way, emphasis may be added to prefetched digital content to improve the purchase likelihood of an item. Further discussion of these and other examples is included in the following sections and shown in corresponding figures.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
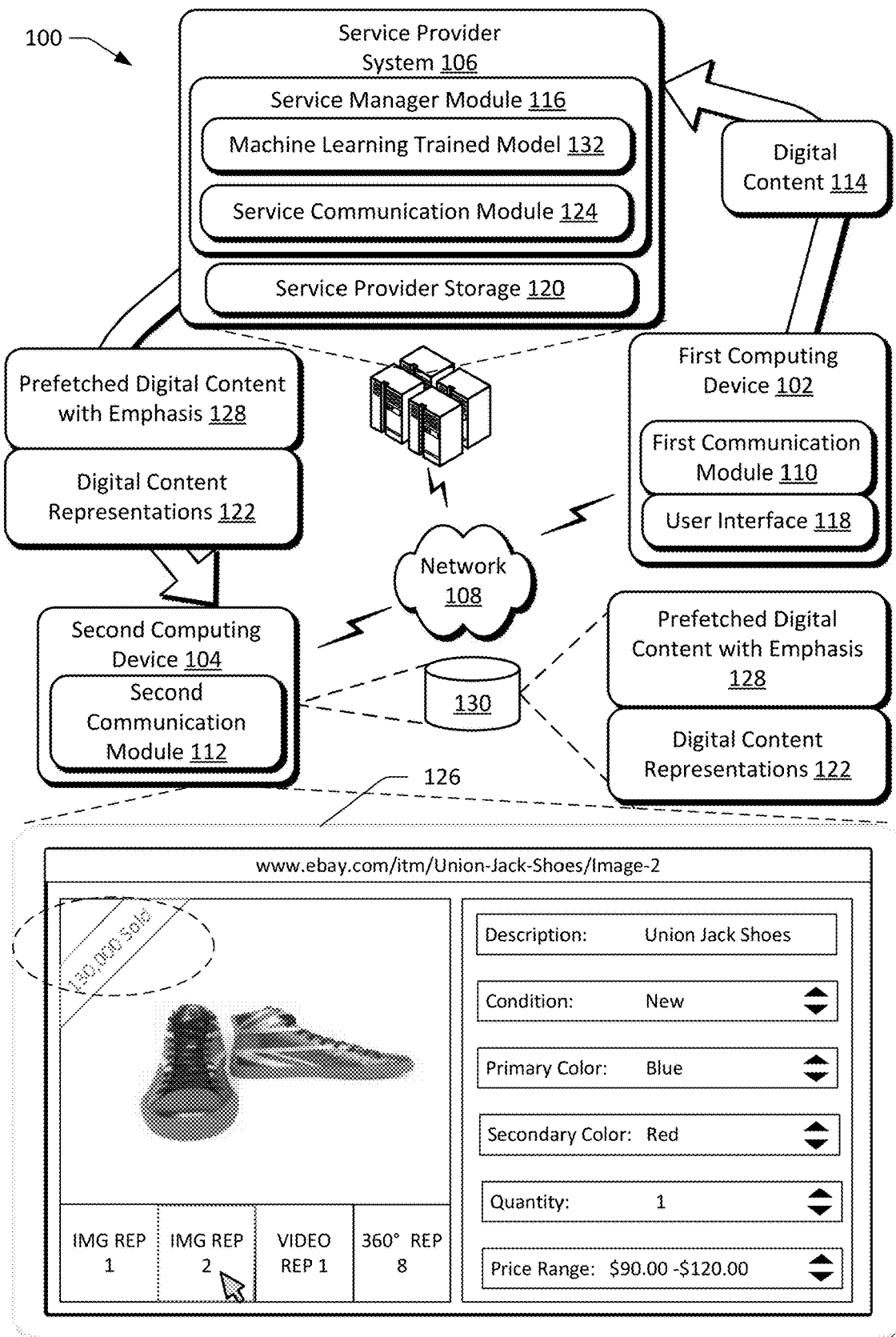
FIG. 1 is an illustration of an environment in an example implementation that is operable to employ techniques for prefetching operation cost based digital content and digital content with emphasis.

Conventional systems fail to address problems associated with accessing and displaying digital content. For example, the conventional systems may not address delays associated with communicating and displaying certain types of digital content, e.g., high resolutions images, videos, AR and VR based content, and so forth. Moreover, these systems lack the functionalities to prefetch and display digital content and content representations on user interfaces in a way that is computationally efficient and increases the likelihood of conversion of items (e.g., based on users interacting with the digital content).

Accordingly, techniques of prefetching operation cost based digital content and digital content with emphasis are described. These techniques are implemented by a service provider system using a model that is trained using machine learning. In one example, a user of a first computing device creates a sale listing for an item on a website hosted by an e-commerce platform that is supported by the service provider system. The sale listing may be created by the service provider system using digital content, e.g., digital images, high resolutions images, videos, and so forth, provided by the user via the first computing device. The images may display a particular item from various angles, while the videos may show individuals interacting with the item, explaining various features, discussing the item's popularity, and so forth. Once created, the sale listing is accessible by other computing devices from the service provider system via the network.

For example, a user of a second computing device accesses the item's sale listing by navigating to the website, entering search terms related to the item, and clicking on a link in the search results associated with the sale listing. From this, the second computing device receives digital content representations from the service provider system, e.g., interactive thumbnails, interactive icons, and other such digital symbols corresponding to the digital content included in the sale listing. These representations are displayed in a user interface of the second computing device.

After the representations (e.g., interactive thumbnails) are displayed, the second computing device may receive prefetched digital content having a changed display characteristic that emphasizes a portion of the digital content. For example, the service provider system may prefetch digital content and include a digital label, digital badge, and so forth using a machine learning trained model. The digital badge may display information such as the quantity of the items sold, discounts associated with the item, free shipping options, the numbers of users interested in the item at a particular time, and so forth. After receiving the prefetched digital content with emphasis, the second computing device stores this content locally in storage of the second computing device. Alternatively, the prefetched digital content may be stored in the cloud, or as part of or in association with the service provider system.

The machine learning trained model used by the service provider system to change the display characteristics may be trained on training data that describes the clicking and scrolling patterns of users, eye movement patterns, time that users spent interacting with the sale listings, and so forth. For example, the training data may indicate that users in some geographic areas have a tendency to click on digital content or content representations displayed on the top left portions of user interfaces, while users in other areas prefer to click on content displayed on the top right portions of user interfaces. In other cases, the scrolling patterns and eye movement in the training data may indicate that some users spent more time viewing descriptions of items, while other interacted primarily with images and videos before making a purchase decision. Accordingly, the training data may indicate various positions on user interfaces in which digital content is likely to attract user attention. Based on analyzing such data, the service provider system may change the display characteristics of certain types of prefetched digital content.

After receiving prefetched digital content with emphasis, the second computing device may receive a user input selecting one of the digital content representations displayed in the user interface of the second computing device. In response, the prefetched digital content corresponding to the selected digital content representation may be rendered on a particular portion of the sale listing that is displayed on the user interface. For example, a user may select a thumbnail in a sale listing and the image corresponding to the thumbnail may be rendered on a portion of the sale listing as including a badge or label. This badge may indicate a quantity of the item in the sale listing that has been sold, a discount amount, a number of users interested in the item at a particular time, and so forth.

In an alternate example, after digital content representations received from the service provider system are displayed on the user interface of the second computing device, the device may receive prefetched digital content from the service provider system based on an operation cost of providing the prefetched digital content and a likelihood of conversion of an item (e.g., good or service) in a sale listing. For example, the service provider system may use a model trained on machine learning to prefetch digital content based on comparing the operation cost of communicating and displaying different types of digital content on various computing devices, with the likelihood of purchase or conversion rate of an item (e.g., good or service) in the sale listing that includes such types of digital content.

For example, the service provider system may prefetch a digital image instead of or prior to certain videos or high resolution images, even if users are more likely to purchase an item upon viewing the videos and high resolution images. This may be done because the computational resource cost of communicating and displaying the videos and high resolutions images outweighs the benefit of a higher purchase likelihood associated with these videos and high resolution images. After receiving the prefetched digital content based on operation cost and likelihood of conversion, the second computing device stores this content locally in storage of the second computing device. Alternatively, the prefetched digital content may be stored in the cloud, or as part of or in association with the service provider system.

The machine learning trained model used by the service provider system to prefetch content based on operation cost and likelihood of conversion may be trained on training data that describes e.g., clicking, scrolling, and eye movement patterns of users, the times associated with communicating and displaying various types of digital content, and so forth. The training data may indicate that while users were more likely to purchase an item upon viewing a video of an item, during the time that the video was being downloaded by a computing device and displayed on a user interface, several other users viewed digital images of the same item's sale listing, and a subset of these users purchased the item. The training data may also indicate that videos, high resolutions images (and other such content) may not be properly downloaded and displayed on user interfaces, which frustrates users. Based on analyzing these factors, the service provider system may utilize the machine learning trained model to prefetch certain types of digital content based on their operation cost.

After receiving prefetched digital content based on operation cost and likelihood of conversion, the second computing device may receive a user input selecting one of the digital content representations displayed in the user interface of the second computing device. In response, the prefetched digital content corresponding to the selected digital content representation may be rendered on a particular portion of the sale listing displayed on the user interface. In this example, digital content may be prefetched based on operation cost such that a digital image may be prefetched instead of or before a video or high resolution image. Moreover, the digital image may be displayed in a more favorable location (e.g., a location that has an increased likelihood of being selected) in the sale listing than the video or high resolution image. For example, the digital image may correspond with a first thumbnail in the sale listing, while the video may correspond with a fifth thumbnail of the listing. Thereafter, a selection of the first thumbnail may cause rendering of the digital image and selection of the fifth thumbnail may cause rendering of the video, high resolution image, and so forth. Further discussion of these and other examples is included in the following sections and shown in corresponding figures.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ prefetching techniques based on operation cost and for use with digital content having emphasis. The illustrated environment 100 includes a first computing device 102, a second computing device 104, and a service provider system 106 that are communicatively coupled, one to another, via a network 108. Computing devices that implement these devices and systems may be configured in a variety of ways.

A computing device, for instance, may be configured as a desktop computer, a laptop computer, a mobile device (e.g., assuming a handheld configuration such as a tablet or mobile phone as illustrated for the second computing device), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is depicted and described in some instances, a computing device may be representative of a plurality of different devices, such as multiple servers utilized by a business to perform operations "over the cloud," as further described in relation to FIG. 8.

The first and second computing devices 102 and 104 communicate with the service provider system 106 via the network 108 using respective communication modules 110, 112. The illustrated service provider system 106 is representative of one of several different service provider systems configured to support provision of digital content via the network 108, including e-commerce platforms that host various websites.

In an example implementation of the techniques described herein, a user (e.g., prospective seller) of the first computing device 102 creates a sale listing for an item on a website hosted by an e-commerce platform. This platform is supported by the service provider system 106, which enables other computing devices to access the sale listing via the website. For example, the user provides digital content 114 related to an item and information describing the item to the service manager module 116 of the service provider system 106 using user interface 118 of the first computing device 102. The digital content 114 is stored in service provider storage 120 of the service provider system 106. The digital content 114 could include digital images, digital audio, digital video, AR and VR based content, and so forth that is made available to other computing devices via a network address (e.g., uniform resource locator).

In the illustrated example, a user of the second computing device 104 may navigate to the website, enter search terms, and click on a link associated with the sale listing of the item. In response, the second computing device 104 receives digital content representations 122 via service communication module 124 of the service provider system 106, which are subsequently displayed on a user interface 126 of the second computing device 104. These representations may be configured in a variety of ways, examples of which include interactive thumbnails, icons, and so forth. These representations are displayed as part of a sale listing in the user interface 126 of the second computing device 104, and correspond to various types of digital content included in the sale listing.

Thereafter, the second computing device 104 receives prefetched digital content with emphasis 128 from the service provider system 106, which are then stored locally in storage 130 of the second computing device 104. Alternatively, the prefetched digital content may be stored in the cloud, or as part of or in association with the service provider system. Specifically, the service provider system 106 uses a machine learning trained model 132 to identify certain types of digital content as prefetches and include a digital badge or label or one or more of these prefetches. The digital badge or label may display information about the quantity of the items sold, discounts associated with the item, information about shipping options, and so forth. The manner in which the machine learning module 132 is used to identify digital content as prefetches and emphasize one or more of these prefetches is described in greater detail in later paragraphs. After receiving the prefetched digital content with emphasis 128, the second computing device 104 receives a user input selecting one of the digital content representations 122. In response, at least one of the prefetched digital content with emphasis 128 is rendered in a portion of the user interface 126.

As depicted in FIG. 1, the user of the second computing device 104 may select an interactive thumbnail labeled "IMG REP 2," in response to which a digital image corresponding to the interactive thumbnail may be rendered in a portion of the sale listing displayed on the webpage. As depicted, the sale listing for the shoes is displayed in the user interface 126 as having three portions. The first portion is designated for displaying an image of the shoes, while a second portion includes one or more thumbnails that correspond to various types of digital content (e.g., videos, images etc.). A third portion includes information about the shoes, such as, description, condition, primary color, quantity, price, and so forth.

In an alternative embodiment, the second computing device 104 receives prefetched digital content based on operation cost of providing digital content by the service provider system 106 and/or receiving the content by the second computing device 104 and a corresponding likelihood of conversion of a good or service (not shown in FIG. 1). The manner in which the machine learning module 132 is used by the service provider system 106 to analyze operation cost of digital content and the likelihood of conversion of items (e.g., goods and services) to prefetch content is also described in greater detail in later paragraphs.

After receiving prefetched digital content based on operation cost and likelihood of conversion, the second computing device 104 receives a user input selecting one of the digital content representations 122 displayed in the user interface 126 of the second computing device 104. In response, the operation cost based prefetched digital content corresponding to the selected digital content representation may be rendered in a particular portion of the sale listing displayed on the user interface 126. Further discussion of these and other examples is included in the following sections and shown in corresponding figures.

In this way, the techniques for prefetching operation cost based digital content and digital content with emphasis address and overcome the problems of conventional systems. In particular, these techniques ensure that service provider system 106 is able to display and provide access to digital content in a sale listing of an item in a manner that is computationally efficient, while ensuring a high likelihood that users purchase the item.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2:
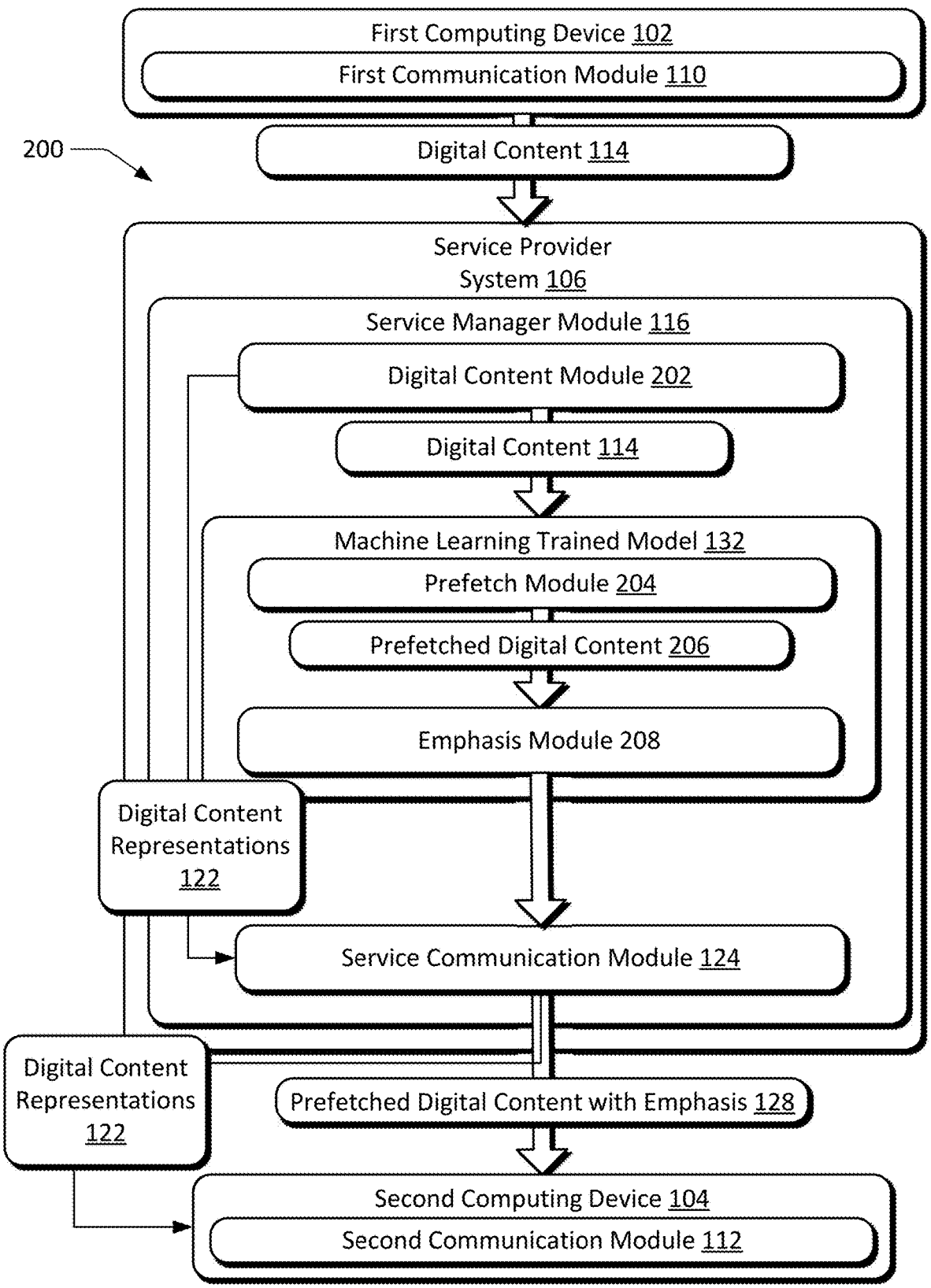
FIG. 2 depicts a system in an example implementation showing operation of the service manager module of FIG. 1 in greater detail as prefetching digital content with emphasis.
Figure 3:
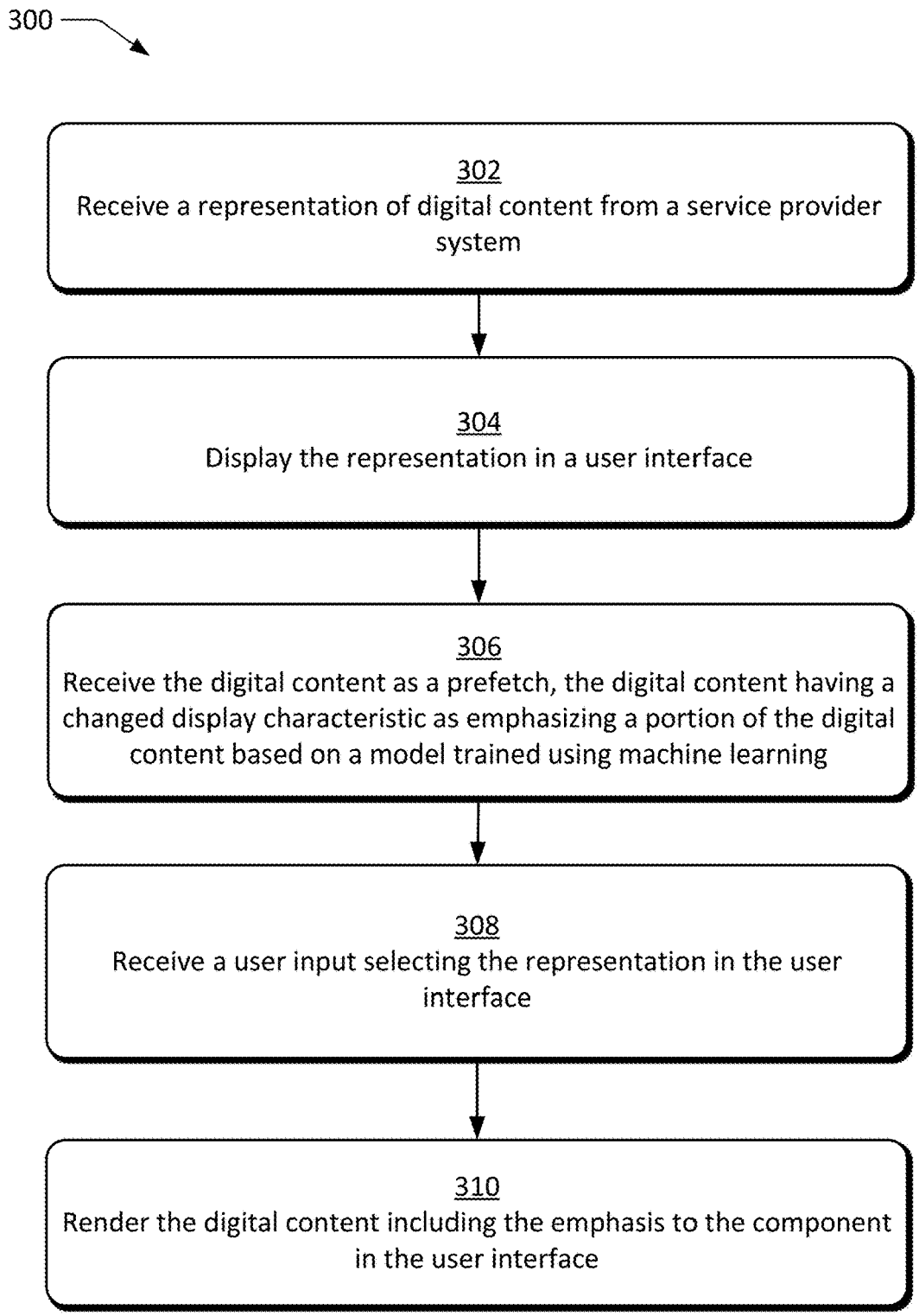
FIG. 3 is a flow diagram depicting a procedure in an example implementation in which prefetched digital content with emphasis is rendered in a user interface.
Figure 4A:
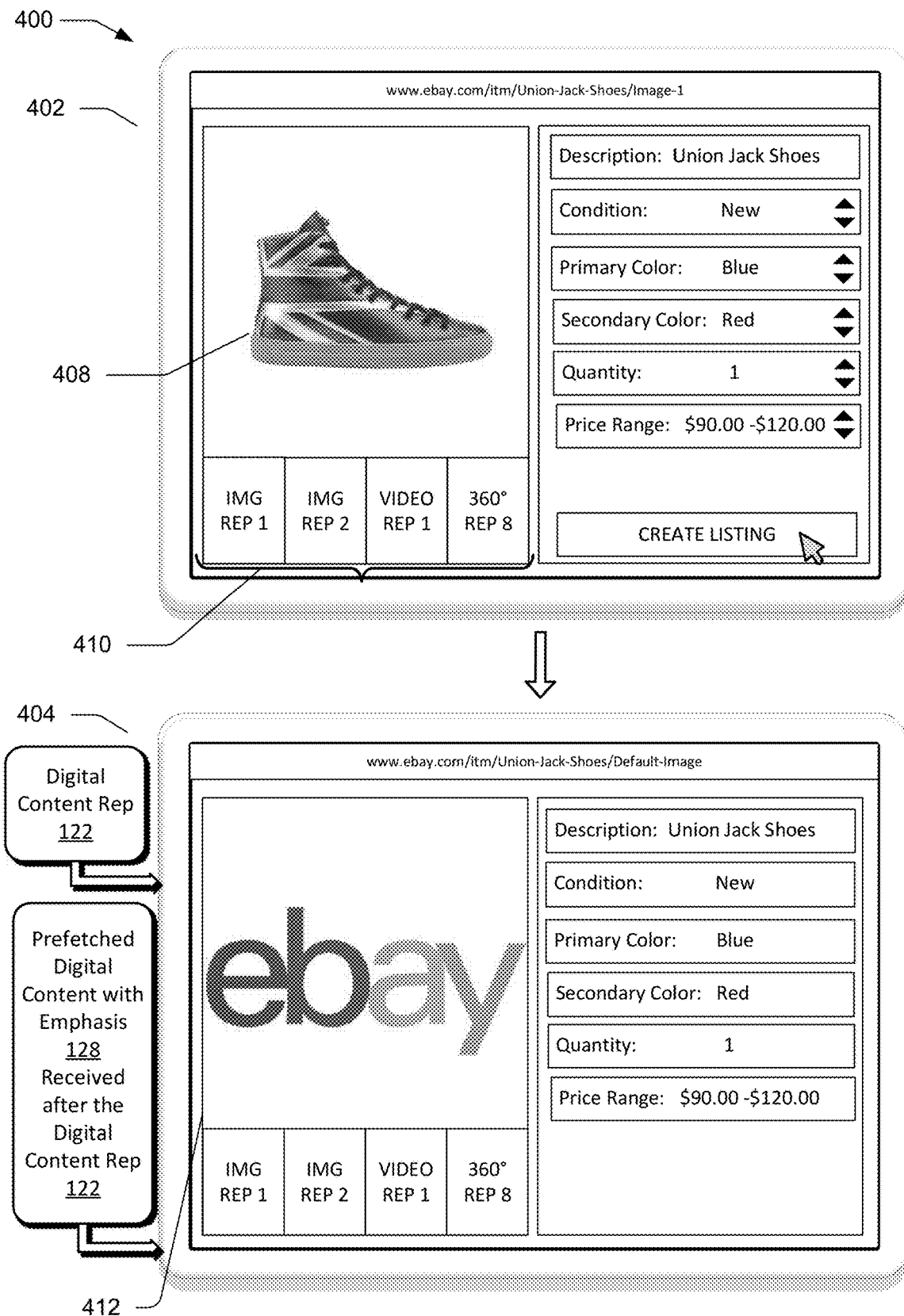
FIGS. 4A & 4B depict an example implementation of a computing device receiving prefetched digital content with emphasis from a service provider system.
Figure 4B:
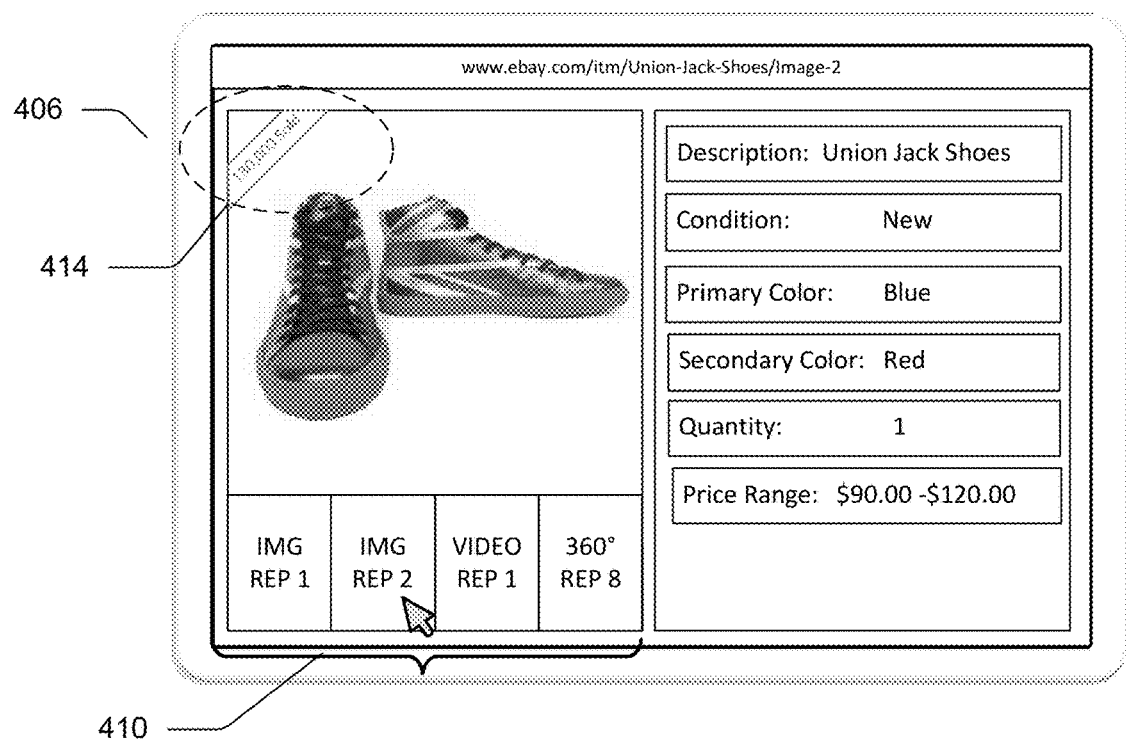

Techniques for Prefetching Operation Cost Based Digital Content and Digital Content with Emphasis FIG. 2 depicts a system 200 in an example implementation showing operation of the service provider system 106 of FIG. 1 in greater detail as prefetching digital content with emphasis. FIG. 3 is a flow diagram depicting a procedure 300 in an example implementation of the operation of the service provider system 106 as rendering prefetched digital content in a user interface with emphasis. FIGS. 4A and 4B depict an example operation 400 of a computing device receiving prefetched digital content with emphasis from the service provider system 106. Example operation 400 is shown in first, second, and third stages 402, 404, and 406 of FIGS. 4A and 4B.

The following discussion describes techniques that may be implemented utilizing the described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In the following discussion, reference is interchangeably made to FIGS. 2-4.

To begin, at first stage 402, an example is shown of the first computing device 102 interacting with the service provider system 106 to create a sale listing for an item 408 (e.g., Union Jack Shoes). Specifically, a user of the first computing device 102 may navigate to a webpage that is part of, e.g., an e-commerce platform supported by the service provider system 106, using a user interface 118 of the first computing device 102. Thereafter, the first communication module 110 is used to provide digital content 114 via network 108 to the service provider system 106, e.g., videos, images, and other such content related to the item 408. In one example, the digital content 114 includes images of the union jack shoes from various angles, and videos of athletes wearing the shoes, consumers discussing the popularity of these shoes, and so forth.

The digital content 114 may be accessed from storage of the first computing device 102 and provided to the service provider system 106 based on user input such as, e.g., a "tap" gesture or click operation, performed on the user interface 118 of the first computing device 102. Alternatively, the digital content 114 may be acquired by the first computing device 102 from third party sources (e.g., other websites) via the network 108. A user may further interact with the webpage via the user interface 118 to enter information related to the item 408, such as description, condition, color, quantity, price range, and so forth. After the digital content 106 and information related to the item 408 are provided, the user may select, via the user interface 118, a "create listing" icon, as depicted in first stage 402.

Upon receiving the digital content 114 related to the item 408, information related to the item, and the selection of the "create listing" icon, the service provider system 106 creates a sale listing for this item. Specifically, the service provider system 106 may transfer the digital content 114 to digital content module 202 of the service manager module 116, which generates digital content representations 122 of the received digital content 114. Alternatively, these digital content representations are provided to the service provider system 106 by the user via the first computing device 102. These digital content representations are stored in service provider storage 120 of the service provider system 106. In one example, the digital content representations 122 are interactive thumbnails 410 of three different images and a video, as depicted in first stage 402 of FIG. 4A. The service manager module 116 configures the display configuration of the sale listing such that information related to the item 408 such as description, condition, colors, quantity, price range information, and so forth, is displayed adjacent to the interactive thumbnails 410. Moreover, digital content corresponding to the interactive thumbnails 410 may be displayed above these thumbnails. Other display configurations are also contemplated. In this way, the service provider system 106 creates a sale listing that may be viewed and accessed by multiple devices via the network 108.

At second stage 404, a user of the second computing device 104 navigates to a webpage of the e-commerce platform supported by the service provider system 106, enters a search query (e.g., union jack shoes), and accesses the sale listing for the item 408 by, e.g., selecting the listing from search results. Upon selecting the sale listing, the second computing device 104 receives digital content representations 122 of the digital content 114 from the service provider system 106 (block 302). These representations are interactive thumbnails 410 that are displayed on the user interface 126 of the second computing device 104 (block 304).

As shown in second stage 404, the interactive thumbnails 410 are displayed underneath a content display portion 412 of the sale listing in which digital content corresponding to one of the interactive thumbnails 410 is configured to be displayed. In one example, this portion may display a placeholder image that is not associated with the item 408, e.g., a logo of the service provider of the e-commerce platform, a generic image of a shoe, etc. Alternatively, the service provider system 106 may send a subset of the digital content 106 to the second computing device 104, e.g., solely the first image of the sale listing, which may be the sole image displayable in the content display portion 412 for a predefined period of time.

It is noted that, as depicted in second stage 404, the service provider system 106 may send the digital content representations 114 to the second computing device 104 via service communication module 110 at a different time than the digital content associated with these representations. In other words, the videos and the images associated with the interactive thumbnails 410 may not be sent to the second computing device 104 simultaneously with the digital content representations 122. Instead, one or more of the digital content 114 corresponding to these representations may be prefetched and sent to second computing device 104 by the service provider system 106 after the digital content representations 122 are sent.

Next, the second computing device 104 receives digital content as a prefetch such that the content has a changed display characteristic that emphasizes a portion of the content based on a model that is trained using machine learning (block 306). Specifically, the second computing device 104 receives prefetched digital content with emphasis 128 from the emphasis module 208 of the service provider system 106 as described in the following paragraphs.

In one example, a prefetch module 204 of the machine learning trained model 132 identifies at least a subset of the digital content 114 as prefetches (i.e. prefetched digital content 206) based on being trained on training data that describes various properties and patterns associated with items in sale listings and digital content associated with these items. For example, the training data may describe the popularity of items and of digital content associated with these items based on the quantity of an item sold within a defined time frame (e.g., one day, a week, a month, etc.). The training data may also describe the scrolling and clicking patterns of users, and the amount of time that a user spent viewing a particular type of digital content related to an item in a sale listing. Alternatively, the prefetch module 204 may analyze the training data in combination with real time data related to the digital content 106 of the item 408 to identify prefetched digital content 206. In this way, the prefetch module 204 may be able to assess and predict, at least in part, a probability that a user will interact with certain types of digital content. Based on this assessment, prefetched digital content 206 is identified.

Thereafter, the prefetch module 204 sends the prefetched digital content 206 to the emphasis module 208 of the machine learning trained model 132, which is configured to change a display characteristic of one or more of this content. The emphasis module 208 of the machine learning trained model 132 is trained using machine learning on training data that describes eye movement patterns of current and past users with respect to various types of digital content associated with items displayed on a webpage. The training data may also describe whether users that interacted with various types of digital content related to sale listings of these items purchased any of these items as a result of changes to display characteristics. Such information would indicate whether changing the display characteristic of digital content improves the conversion rate of goods or services, e.g., the likelihood that users purchase various items based on their interactions with sale listings of these items.

The training data may further describe whether there is a relationship between the location of the changed display characteristic and the likelihood that an item was purchased. In other words, whether it is more likely that an item in a sale listing may be purchased if a display characteristic is changed on, e.g., a top left corner of a particular type of digital content. Such information may indicate, for example, that users notice changes in display characteristics in top-left corners of content. The emphasis module 208 may also be trained on the training data (as described above) in combination with real time data related to the digital content 106, to change a display characteristic of one or more of the prefetched digital content 206. In this way, the emphasis module 208 may change the display characteristic of at least one of the prefetched digital content 206 to generate the prefetched digital content with emphasis 128.

After the second computing device 104 receives the prefetched digital content with emphasis 128 from the service provider system 106, this content is stored in storage 130 of the second computing device 104. It is noted that the prefetched digital content with emphasis 128 may include various types of digital content such that at least one of the digital content may include a changed display characteristic, which emphasizes a particular portion of digital content. Other types of digital content, however, may retain their respective display characteristics. In other words, the prefetched digital content with emphasis 128 may include, e.g., digital content in the form of a video with no change in display characteristics, and digital content in the form of an image that does include a changed display characteristic.

Returning to FIG. 4, at third stage 406, the user of the second computing device 104 selects one of the digital content representations 122 displayed in the user interface 126 of the second computing device 104 (block 308). As depicted, the user selects using, e.g., a "tap" gesture or click operation performed via the user interface 126 of the second computing device 104, one of the interactive thumbnails 410 (the one labeled "IMG REP 2"). In response, the second computing device 104 renders one of the prefetched digital content with emphasis 128 in a portion the user interface 132 of the second computing device 104 (block 310).

As depicted, the rendered digital content is an image associated with one of the interactive thumbnails 410 (IMG REP 2) with a changed displayed characteristic, e.g., an image of the union jack shoes with badge 414. Specifically, the image shows a front view and a side view of the union jack shoes and includes the badge 414 with text that says, "130,000 sold." Such information indicates the popularity of these shoes. In this way, a portion of one of the prefetched digital content with emphasis 128 is emphasized to increase the likelihood that the user of the second computing device 104 that views this sale listing will purchase the shoes.

While emphasis in the form of a badge or label is described, the emphasis may also be based on highlighting or bolding portions of or the entirety of digital content, changing the background color of digital content, coloring the borders of digital content, or marking portions of the digital content in similar ways. Numerous other ways of providing emphasis are also contemplated. It is noted that in some instances, emphasizing the digital content does not change a location on the user interface 126 of the second computing device 104 in which the one or more of the prefetched digital content with emphasis 128 is rendered. It is also noted that the prefetched digital content with emphasis 128 is received from the service provider system 106 and stored in the storage 130 of the second computing device 104 before the user of the second computing device 104 selects one of interactive thumbnails 410.

Operation Cost Based Digital Content Prefetching Techniques

Figure 5:
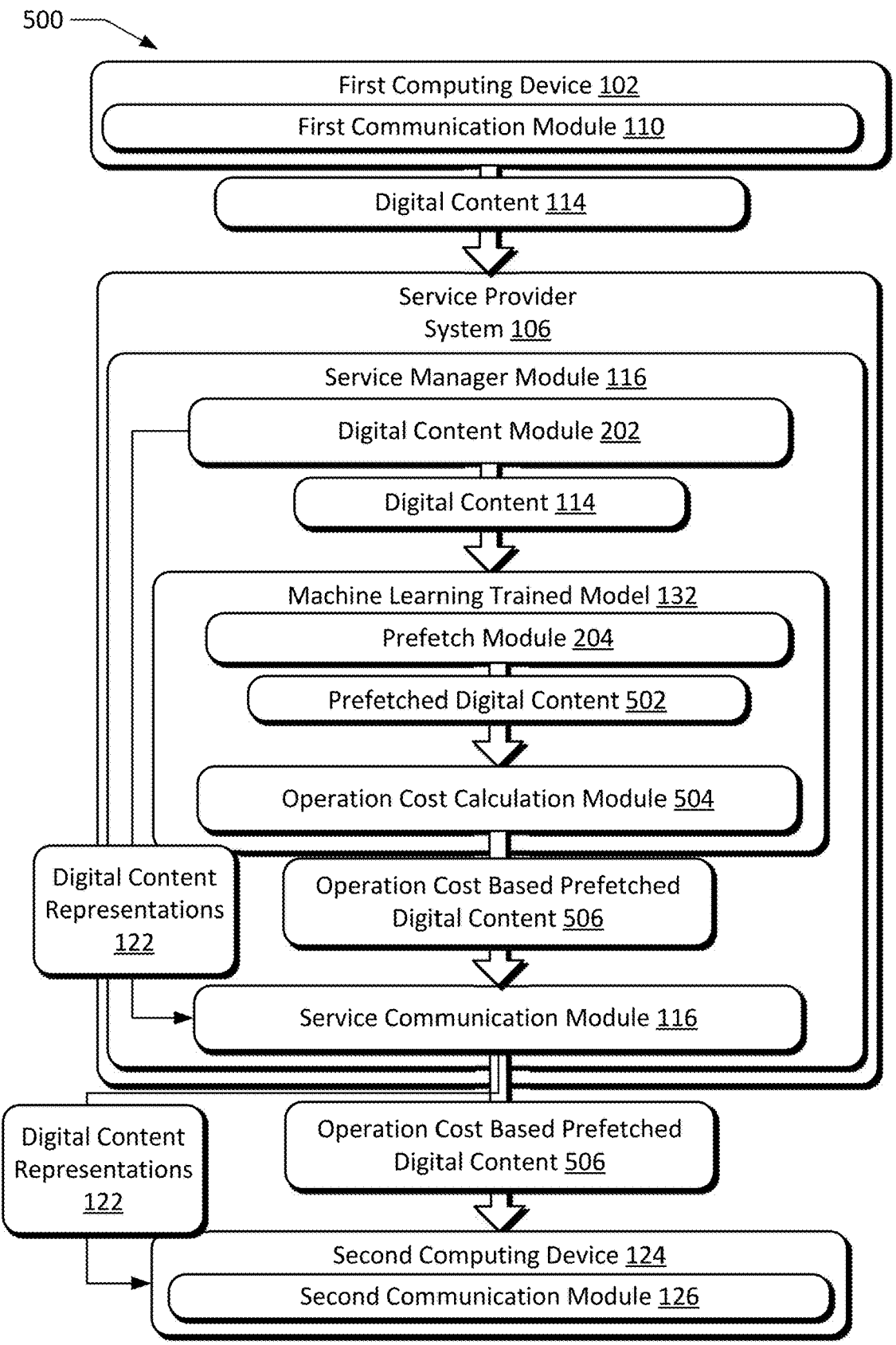
FIG. 5 depicts a system in an example implementation showing operation of the service manager module of FIG. 1 in greater detail as prefetching digital content based on operation cost of providing content included in a sale listing and the likelihood of conversion of an item (e.g., good or service) in the sale listing.
Figure 6:
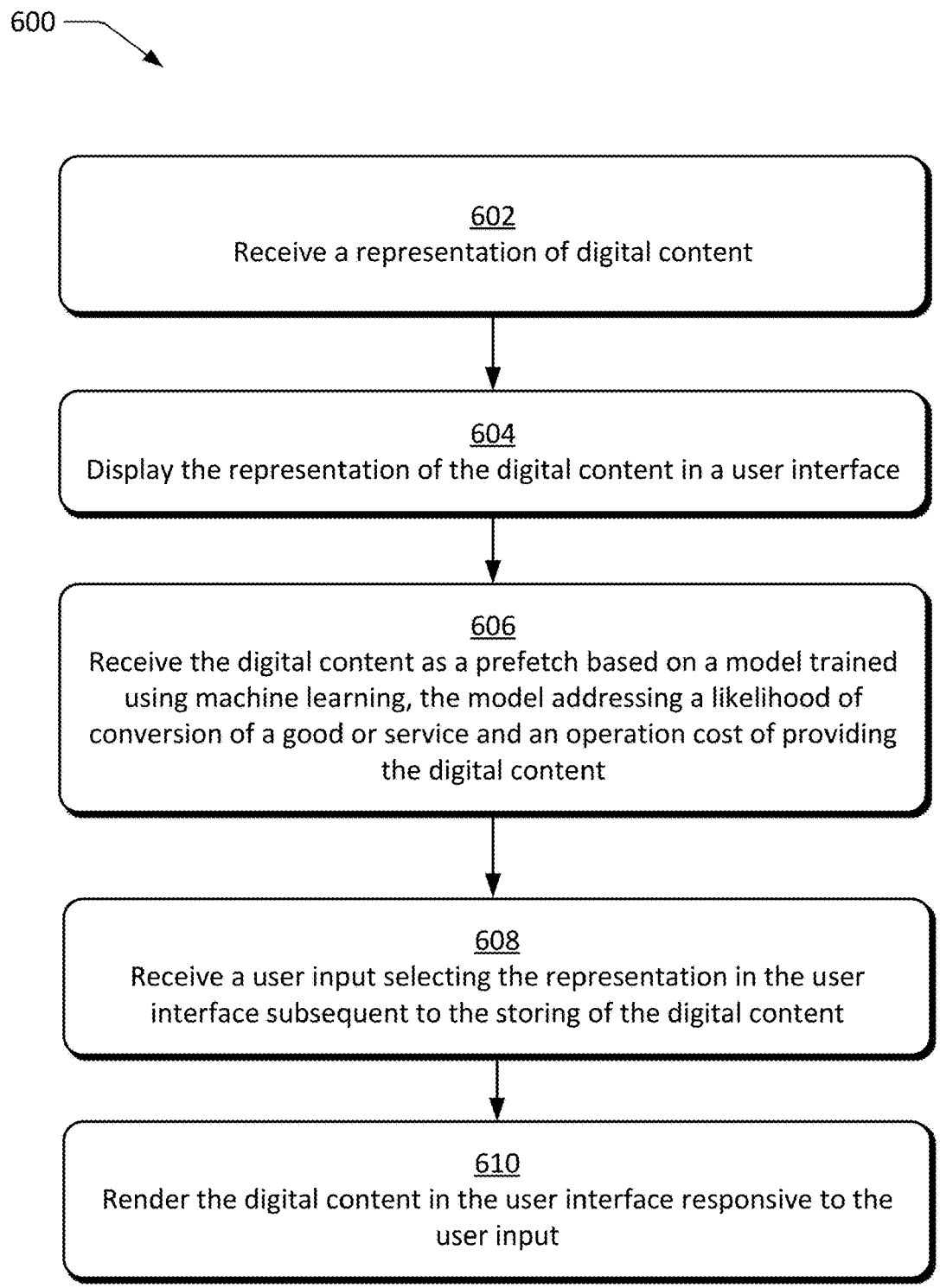
FIG. 6 is a flow diagram depicting a procedure in an example implementation in which digital content prefetched based on operation cost of providing the content and the likelihood of conversion of an item (e.g., good or service) is rendered in a user interface.

FIG. 5 depicts a system 500 in an example implementation showing operation of service provider system 106 of FIG. 1 in greater detail as prefetching digital content based on operation cost of providing content included in a sale listing and the likelihood of conversion of an item (e.g., good or service) in the sale listing. FIG. 6 is a flow diagram depicting a procedure 600 in an example implementation showing operation of the service provider system 106 as prefetching digital content based on operation cost of providing content included in a sale listing and the likelihood of conversion of an item (e.g., good or service) in the sale listing.

The following discussion describes techniques that may be implemented utilizing the described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In the following discussion, reference is interchangeably made to FIGS. 5-7.

Figure 7A:
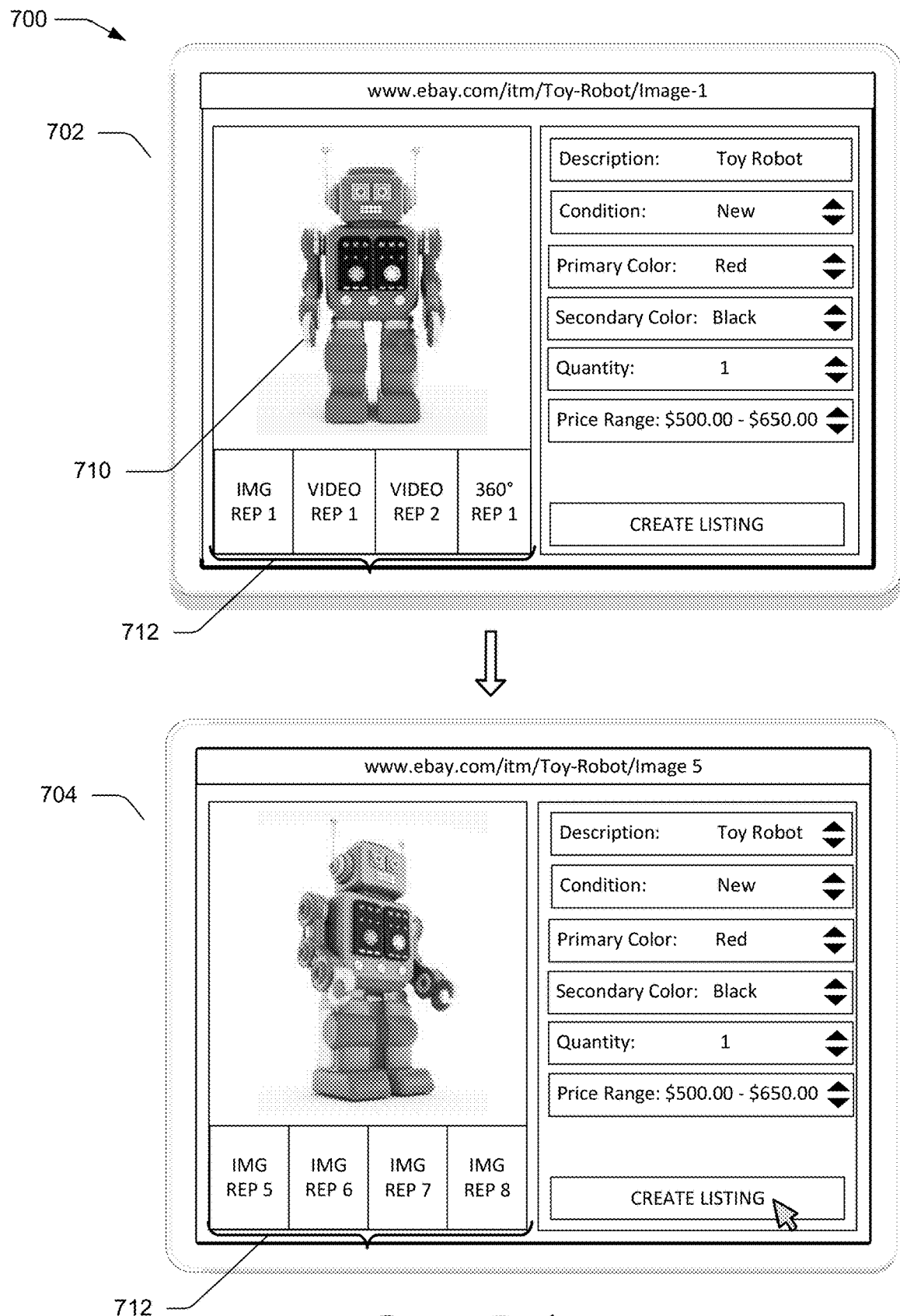
FIGS. 7A & 7B depicts an example implementation of a computing device receiving digital content from a service provider system that is prefetched based on operation cost of the digital content in a sale listing and likelihood of conversion of an item (e.g., good or service) included in the sale listing.
Figure 7B:
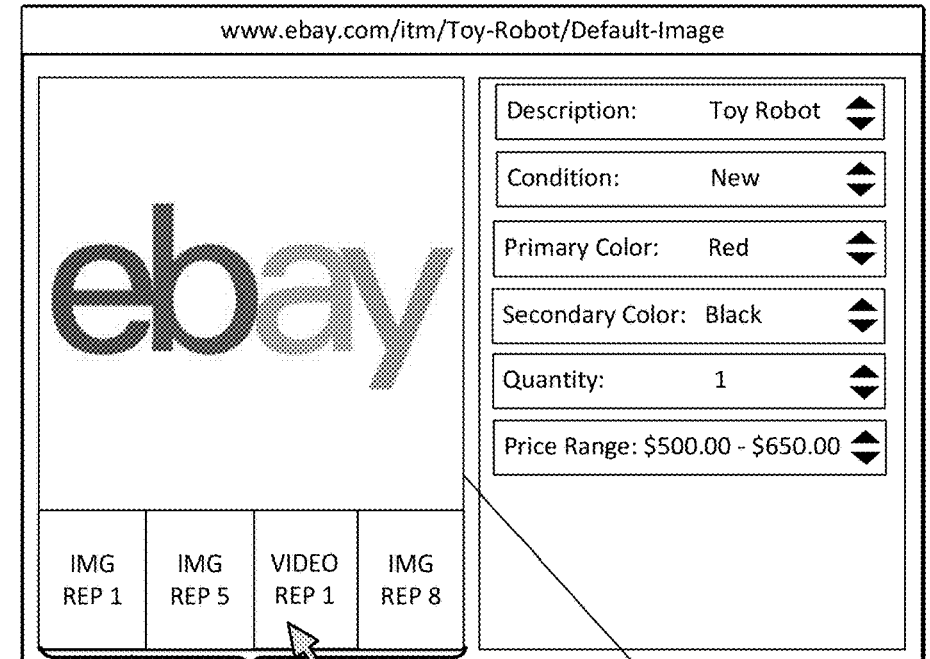
Figure 7B:
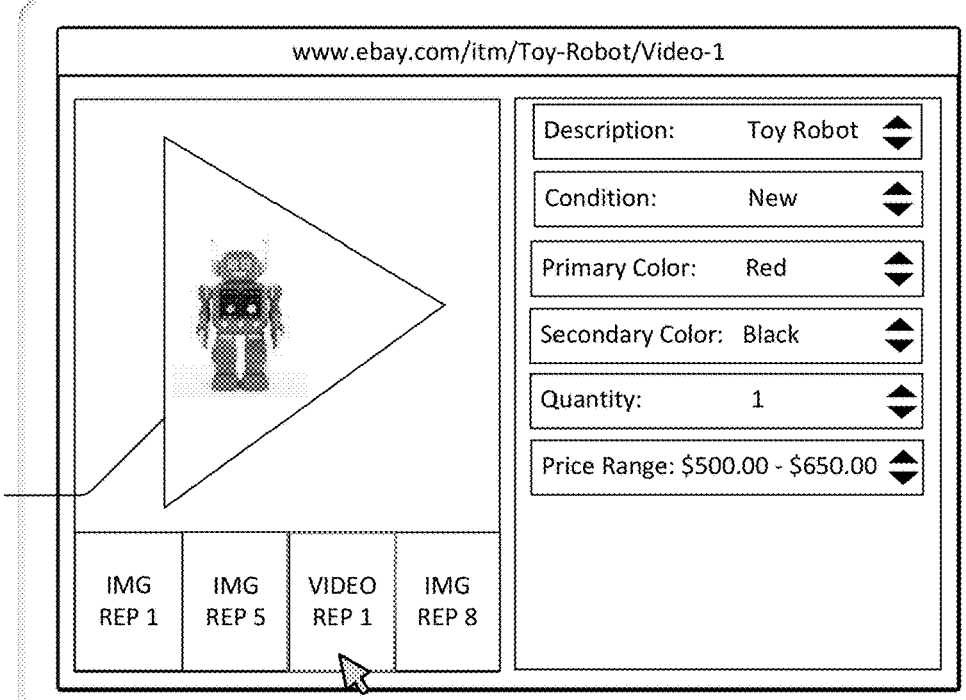

FIGS. 7A and 7B depict an example operation 700 of a computing device receiving digital content from a service provider system that is prefetched based on operation cost of the digital content in a sale listing and likelihood of conversion of an item (e.g., good or service) included in the sale listing. Example operation 700 is shown in first, second, third, and fourth stages 702, 704, 706, and 708 of FIGS. 7A and 7B.

To begin, at first and second stages 702 and 704, an example of the first computing device 102 interacting with the service provider system 106 to create a sale listing for an item 710 (e.g., Toy Robot) is shown. Specifically, a user of the first computing device 102 may navigate to a webpage that is part of, e.g., an e-commerce platform supported by the service provider system 106, using a user interface 118 of the first computing device 102. Thereafter, the first communication module 110 of the first computing device 102 is used to provide digital content 114 to the service provider system 106, e.g., videos, images, and other such content related to the item 710. In one example, the digital content 114 includes images of the item 710 from various angles, images of various parts used in making the toy robot, and a toy robot advertisement video, etc. A user may further interact with the webpage via the user interface 118 of the first computing device 102 and enter information related to the item, such as description, condition, color, quantity, and price range of the item 710. After the digital content 114 and information related to the item is provided to the service provider system 106, the user selects a "create listing" icon as depicted in the second stage 704 in FIG. 7A.

Upon receiving the digital content 114 related to the item 710, information related to the item, and the selection of the "create listing" icon, the service provider system 106 creates a sale listing for this item. Specifically, the service provider system 106 may transfer the received digital content 114 to the digital content module 202 of the service manager module 116, which generates digital content representations 122 of the digital content 114. Alternatively, these representations may be provided to the service provider system 106 by the user via the first computing device 102. As stated, these digital content representations are stored in service provider storage 120 of the service provider system 106. In one example, the digital content representations 122 are interactive thumbnails 712 of different images and a video, as depicted in first stage 702 and second stage 704. As illustrated, the interactive thumbnails 712 include six interactive thumbnails of six different images of the item 710, an interactive thumbnail related of a video of the item, and an interactive thumbnail of a 360° view image of the item. The interactive thumbnails 712 may be displayed underneath a portion of the listing where digital content corresponding to these thumbnails may be displayed. Other display configurations are also contemplated. In this way, the service provider system 106 creates a sale listing that may be viewed and accessed by multiple devices via the network 108.

At third stage 706, a user of the second computing device 104 navigates to a webpage of the e-commerce platform supported by the service provider system 106, enter a search query (e.g., red colored toy robot under $700.00), and accesses the sale listing for the item 710 by, e.g., selecting the sale listing from search results. Upon selecting the sale listing, the second computing device 104 receives digital content representations 122 of the digital content 114 from the service provider system 106 (block 602). These representations may be the interactive thumbnails 712 depicted in first and second stages 702 and 704, and displayed on the user interface 126 of the second computing device 104 (block 604).

As depicted, the display representations 122 are displayed in the user interface 126 of the second computing device 104 in an arrangement that is different from that of the user interface 118 of the first computing device 102 (e.g., the arrangement in which a seller provided digital content 114 to the service provider system 106). The manner in which the arrangement is varied by service provider system 106 will be described in later paragraphs. Moreover, the digital content display representations 122 (e.g., the interactive thumbnails 712) are displayed underneath a content display portion 714 of the sale listing. The content display portion 714, as in the example depicted in FIG. 7B, displays a placeholder image that is not associated with the item 710. This image may be configured in a variety of ways, e.g., a logo of the service provider of the e-commerce platform, a generic image of a toy robot, etc. Alternatively, the service provider system 106 may send a subset of the digital content 114 to the second computing device 104, e.g., a first image of the sale listing, which may be the sole image displayable in the content display portion 714 for a period of time.

It is also noted that, as depicted in third stage 706, the service provider system 106 sends the digital content representations 122 to the second computing device 104 via service communication module 112 at a different time than the digital content associated with these representations. In other words, the videos and the images associated with the interactive thumbnails 712 may not be sent to the second computing device 104 simultaneously with the digital content representations 122. Instead, one or more of the digital content 106 corresponding to these representations may be prefetched based on an operation cost and likelihood of conversion calculation and sent to the second computing device 104 after the digital content representations 122 are sent.

Next, the second computing device 104 receives digital content as a prefetch based on a model trained using machine learning, which addresses a likelihood of conversion of an item in a sale listing (e.g., good or service) and an operation cost of providing the digital content related to this good or service (block 606). Specifically, the second computing device 102 may receive operation cost based prefetched digital content 506 from the operation cost calculation module 504 of the service provider system 106 as described in the following paragraphs.

In one example, the prefetch module 204 of the machine learning trained model 132 may identify at least a subset of the digital content 114 as prefetches (i.e. prefetched digital content 502) by being trained on training data that describes various properties and patterns associated with various items in sale listings and digital content associated with these items, as described above. Thereafter, the prefetch module 204 may send the prefetched digital content 502 to an operation cost calculation module 504, which is configured to determine the operation costs for providing the prefetched digital content 502, select at least a subset of the prefetched digital content 502 as prefetches, and determine a display arrangement for these prefetches.

The operation cost calculation module 504 of the machine learning trained model 132 is trained using machine learning on training data that describes an operation cost of providing various types of digital content to devices. The training data may describe the amount of time and computational resources for communicating and displaying digital content in the form of a video, AR or VR based content, high resolution images, uncompressed images, images with large file sizes, etc. The computational resources for communicating and displaying such digital content may be determined to be high when compared with digital content having lower resolutions and file sizes.

The operation cost calculation module 504, after being trained on this training data, selects the operation cost based prefetched digital content 506 by balancing the cost of communicating and displaying various types of digital content related to various items that may be borne by the service provider system 106 (and other computing devices) with the likelihood of conversion of these items (e.g., goods or services). In other words, the operation cost calculation model 504 may select operation cost based prefetched digital content 506 from prefetched digital content 502 that, e.g., maximizes the likelihood that users purchase the item 710, while minimizing the overall cost to the service provider system 106 and other devices (e.g., second computing device 104).

The operation cost calculation module 504 may also determine a display arrangement for the operation cost based prefetched digital content 506, according to which this content is displayed on the user interfaces of various devices. For example, the operation cost based prefetched digital content 506 is displayed on user interfaces of devices such that digital content representations corresponding to digital content having a lower communicating and display time are arranged in a more attractive location on the user interface than those of content having a higher operation cost, even if the likelihood of conversion of the content with the higher operation cost is better. In another example, the operation cost based prefetched digital content 506 is displayed on user interfaces of devices in various locations and arrangements based on the computational capacity used by these devices to download and display various types of digital content, e.g., digital images are prefetched and arranged in a more attractive location than a video because devices can download and display many images in the time that it takes to download and display a video. Other display arrangements are also contemplated. After the operation cost based prefetched digital content 506 is received by the second computing device 104, this content is stored in the storage 130 of the device. Specifically, the operation cost based prefetched digital content 506 is stored locally in the storage 130 of the second computing device 104. Alternatively, the prefetched digital content may be stored as part of or in association with the service provider system, or as part of the cloud.

Returning to FIG. 7, at fourth stage 708, the user of the second computing device 104 may select one of the digital content representations 122 after the operation cost based prefetched digital content 506 is received (block 608). As depicted, the user may select one of the interactive thumbnails 712 (the one labeled "VIDEO REP 1"). In response, the second computing device 104 renders one of the operation cost based prefetched digital content 506 that corresponds to the interactive thumbnail labeled "VIDEO REP 1" in the user interface 126 of the second computing device 104 (block 610).

As depicted, the rendered digital content may be configured in a variety of ways, e.g., an advertisement video 716, which may be configured to play automatically upon selection of the corresponding interactive thumbnail, or involve additional input from the user of the second computing device 104. It is noted that the interactive thumbnail corresponding to VIDEO REP 1 may have the largest conversion rate of all the operation cost based prefetched digital content 506, but may still be arranged third in the display arrangement of the interactive thumbnails 712, because the cost of communicating and displaying this video may be significantly higher than that of the content corresponding to the interactive thumbnails labeled "IMG REP 1" and "IMG REP 5."

Moreover, even if the likelihood of conversion of the content corresponding to the IMG REP 1 and the IMG REP 5 is lower than the advertisement video 716, the operation cost of displaying the content corresponding to these representations may justify arranging IMG REP 1 and the IMG REP 5 in a more attractive location than VIDEO REP 1. It is also noted that the operation cost based prefetched digital content 506 is received and stored in storage 130 of the second computing device 104 before the user of the second computing device 104 selects one of the interactive thumbnails 712.

Example System and Device

Figure 8:
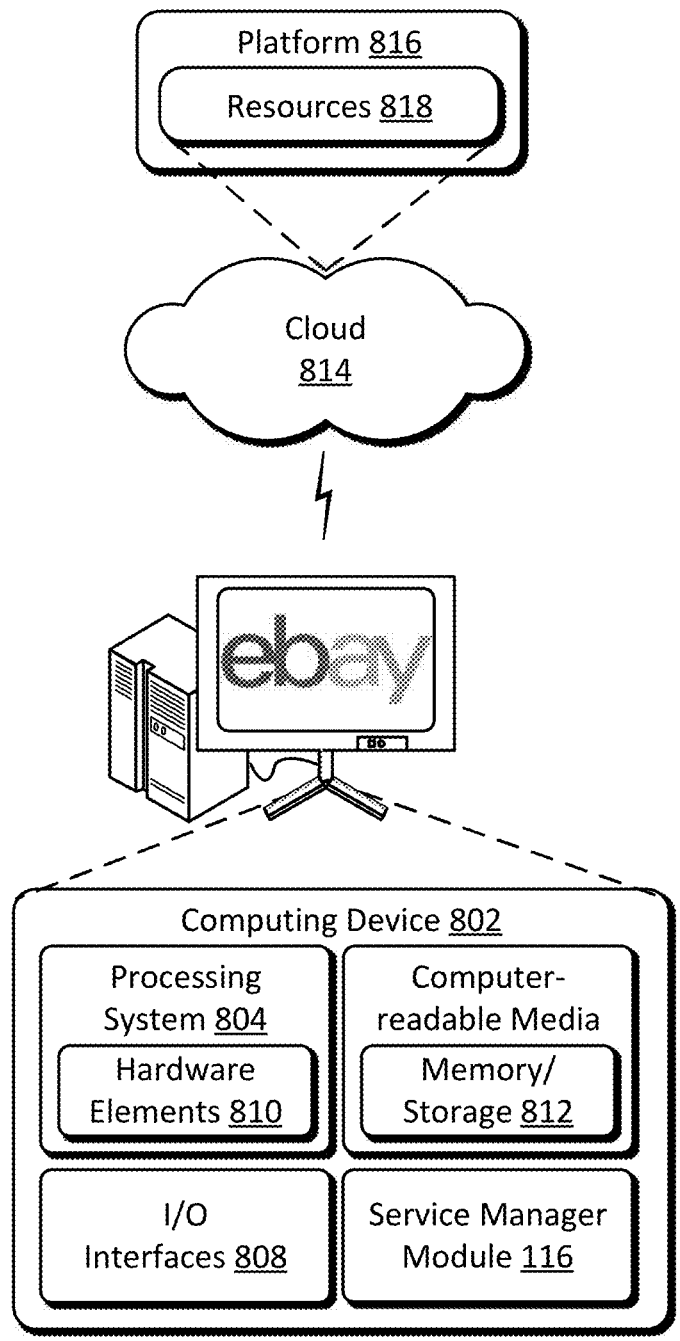
FIG. 8 illustrates an example system including various components of an example device that can be implemented as any type of computing device as described and/or utilized with reference to FIGS. 1-8 to implement embodiments of the techniques described herein.

FIG. 8 illustrates an example system 800 that includes an example computing device 802 that is representative of one or more computing systems and/or devices that may implement the various techniques described herein. This is illustrated through inclusion of the service manager module 116. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
    transmitting, by the computing device, a plurality of representations corresponding to digital content to be displayed in a user interface associated with a client device;
    determining, by the computing device, a probability of interaction with the digital content based on a model trained using machine learning, the model being trained using user interaction data;
    determining, by the computing device, an operation cost to be incurred by the computing device to transmit data of the digital content via a network from the computing device to the client device;
    selecting, by the computing device, a subset of the digital content as a prefetch, the prefetch selected based on a comparison of the probability of interaction with the digital content and the operation cost to be incurred by the computing device to transmit the data of the digital content via the network from the computing device to the client device;
    determining, by the computing device, a display arrangement for the representations corresponding to the subset of the digital content in the user interface associated with the client device based on the probability of interaction and the operation cost; and
    transmitting, by the computing device, the subset of the digital content and the display arrangement to the client device, the representations displayed in the display arrangement and selectable to cause display of corresponding digital content of the subset of digital content in the user interface associated with the client device.

2. The method as described in claim 1, wherein the operation cost is based on a size of the data of the digital content.

3. The method as described in claim 1, wherein the operation cost includes a hardware cost of communicating the data of the digital content from the computing device to the client device via the network.

4. The method as described in claim 1, wherein the client device receives the transmitted subset of the digital content as the prefetch before receiving user selection of at least one of the representations corresponding to the subset of digital content.

5. The method as described in claim 1, wherein the operation cost is based on a type of digital content.

6. A computing device comprising:
    a processor; and computer-readable storage media having instructions stored thereon that, responsive to execution by the processor, causes the processor to perform operations comprising:
- transmitting a plurality of representations corresponding to digital content to be rendered in a user interface associated with a client device;
- determining a probability of interaction with the digital content based on a model trained using machine learning, the model being trained using user interaction data;
- determining an operation cost to be incurred by the computing device to transmit data of the digital content via a network from the computing device to the client device;
- selecting a subset of the digital content as a prefetch, the prefetch selected based on the probability of interaction with the digital content and the operation cost to be incurred by the computing device;
- determining a display arrangement for the representations corresponding to the subset of the digital content in the user interface associated with the client device based on the probability of interaction and the operation cost; and
- transmitting the subset of digital content and the display arrangement to the client device, the representations displayed in the display arrangement and selectable to cause display of corresponding digital content of the subset of digital content in the user interface associated with the client device.

7. The computing device as described in claim 6, wherein the model further addresses an amount of emphasis involving a display characteristic of a portion of the digital content.

8. The computing device as described in claim 7, wherein the emphasis does not change a location on the user interface at which the digital content is rendered.

9. The computing device as described in claim 7, wherein the emphasis includes at least one of holding, highlighting, or badging.

10. The computing device as described in claim 7, wherein the emphasis changes the display characteristic of the portion based on a likelihood of conversion.

11. One or more computer-readable storage media comprising instructions stored thereon that, responsive to execution by a processing system, causes the processing system to perform operations including:
- transmitting a plurality of representations corresponding to digital content to be displayed in a user interface associated with a client device;
- determining a probability of interaction with the digital content based on a model trained using machine learning, the model being trained using user interaction data;
- determining an operation cost to be incurred by the processing system to transmit data of the digital content via a network from the processing system to the client device;
- selecting a subset of the digital content to prefetch, the subset of the digital content prefetched based on a comparison of the probability of interaction with the digital content and the operation cost to be incurred by the processing system to transmit the data of the digital content via the network from the processing system to the client device;
- determining a display arrangement for the representations corresponding to the subset of the digital content in the user interface associated with the client device based on the probability of interaction and the operation cost; and
- transmitting the prefetched subset of the content and the display arrangement to the client device, the representations displayed in the display arrangement and selectable to cause display of corresponding digital content of the subset of digital content in the user interface associated with the client device.

12. One or more computer-readable storage media as described in claim 11, wherein the probability of interaction includes a likelihood of conversion of respective products or services.

13. One or more computer-readable storage media as described in claim 11, wherein at least one digital content of the subset of the digital content includes a portion having a changed display characteristic based on the model.

14. The method as described in claim 1, wherein the operation cost is based on a time associated with transmitting the digital content.

15. The method as described in claim 1, wherein the plurality of representations are interactive thumbnails that cause display of corresponding digital content.

16. The method as described in claim 1, wherein the digital content is part of a listing for an item for sale.

17. The computing device as described in claim 6, wherein the operation cost is based on a file size of the digital content.

18. One or more computer-readable storage media as described in claim 11, wherein the digital content includes at least one of digital images, digital videos, augmented reality based content, or virtual reality based content.

19. The computing device as described in claim 6, wherein the operation cost includes a network cost to be incurred upon transmission of the digital content.

20. One or more computer-readable storage media as described in claim 11, wherein the operation cost is based on a file size of the digital content.

* * * * *